United States Patent
Kinomura et al.

(10) Patent No.: US 12,257,916 B2
(45) Date of Patent: Mar. 25, 2025

(54) CHARGING FACILITY AND CONTROL METHOD OF CHARGING FACILITY

(71) Applicant: TOYOTA JIDOSHA KABUSHIKI KAISHA, Aichi-ken (JP)

(72) Inventors: Shigeki Kinomura, Toyota (JP); Yamato Niwa, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 394 days.

(21) Appl. No.: 17/699,174

(22) Filed: Mar. 21, 2022

(65) Prior Publication Data

US 2022/0305932 A1    Sep. 29, 2022

(30) Foreign Application Priority Data

Mar. 26, 2021   (JP) ................. 2021-053047

(51) Int. Cl.
*B60L 53/35* (2019.01)
*B60L 53/31* (2019.01)
*H02J 7/00* (2006.01)

(52) U.S. Cl.
CPC ............ *B60L 53/35* (2019.02); *B60L 53/31* (2019.02); *H02J 7/0042* (2013.01)

(58) Field of Classification Search
CPC .................... B60L 53/35; H02J 7/0042
USPC ......................................... 320/109
See application file for complete search history.

(56) References Cited

U.S. PATENT DOCUMENTS

| | | | |
|---|---|---|---|
| 5,974,743 A | 11/1999 | Vaia | |
| 11,479,135 B2* | 10/2022 | Price | B60L 53/305 |
| 2016/0207406 A1* | 7/2016 | Kauffmann | B60L 53/30 |
| 2017/0366024 A1 | 12/2017 | Chen et al. | |
| 2020/0180456 A1* | 6/2020 | Kauffmann | B60L 53/30 |
| 2020/0324661 A1* | 10/2020 | Freeling-Wilkinson | B60L 53/35 |
| 2021/0053456 A1* | 2/2021 | Freeling-Wilkinson | B60L 53/14 |
| 2021/0252989 A1* | 8/2021 | Price | B60L 53/31 |
| 2022/0388482 A1* | 12/2022 | Kinomura | B60L 53/14 |

FOREIGN PATENT DOCUMENTS

| | | |
|---|---|---|
| CN | 107707002 A | 2/2018 |
| JP | H11-502910 A | 3/1999 |
| JP | 2007-216790 A | 8/2007 |
| JP | 2011109807 A | 6/2011 |
| JP | 2012-100448 A | 5/2012 |
| JP | 5475407 B2 | 4/2014 |
| JP | 2017-229221 A | 12/2017 |
| JP | 2019-154190 A | 9/2019 |

* cited by examiner

*Primary Examiner* — Jack Chiang
*Assistant Examiner* — Suchin Parihar
(74) *Attorney, Agent, or Firm* — HAUPTMAN HAM, LLP

(57) ABSTRACT

A controller executes a process including: a step of acquiring weather information when a first state is attained; and a step of executing lift-up control in the case of precipitation or in the case where precipitation is predicted within a first time; a step of maintaining the second state in the case where the precipitation is ended; and a step of executing lift-down control in the case of passage of a second time.

8 Claims, 6 Drawing Sheets

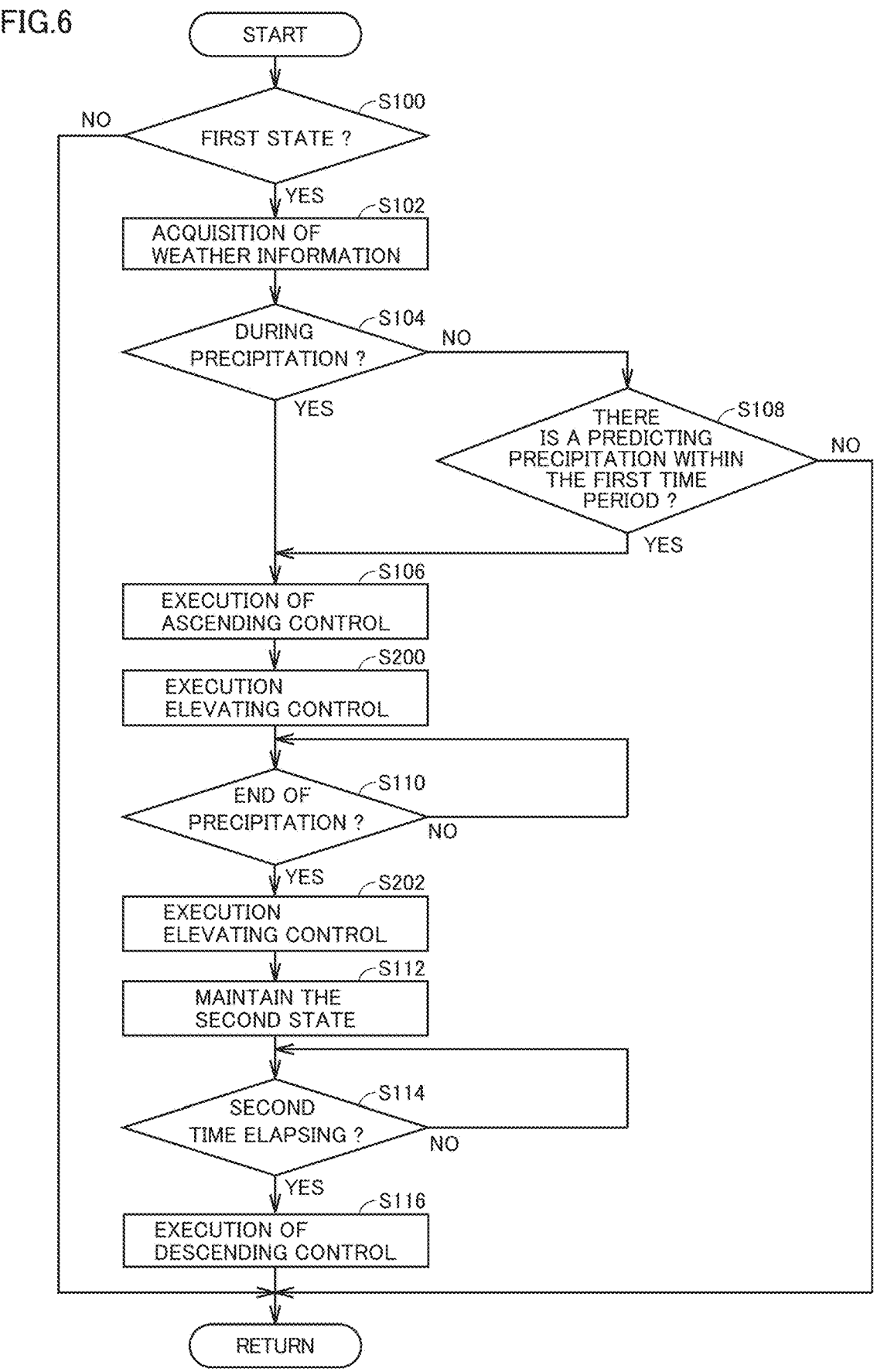

CHARGING FACILITY AND CONTROL METHOD OF CHARGING FACILITY

This nonprovisional application is based on Japanese Patent Application No. 2021-053047 filed on Mar. 26, 2021 with the Japan Patent Office, the entire contents of which are hereby incorporated by reference.

BACKGROUND

Field

The present disclosure relates to control of a movable charging facility for charging an in-vehicle power storage device.

Description of the Background Art

Although a charging facility for charging a power storage device mounted on a vehicle or the like is installed in a parking lot or a walkway outside the vehicle or the like, the charging facility occupies an installation space, which may hinder walking or traveling of the vehicle. Therefore, there is known a technique in which a charging facility is made movable and stored under the ground, for example.

For example, Japanese Patent Laying-Open No. 2011-109807 discloses a charging pole which can rise from the ground and can be moved up and down so as to be accommodated under the ground.

SUMMARY

When the movable type charging facility that can be lifted up/down as described above is not in use, sand and mud are likely to enter the movable unit and become soiled because the movable type charging facility is accommodated under the ground. The portion soiled by sand or mud may cause problems such as rust and corrosion.

An object of the present disclosure is to provide a charging facility and a method of controlling the charging facility, so as to suppress occurrence of a problem caused by entrance of sand or mud into a movable unit.

A charging facility according to an aspect of the present disclosure is a charging facility of movable type, the charging facility being installed on a bottom surface of a recess formed in a ground, the charging facility being capable of charging an power storage device mounted on a vehicle. The charging facility includes a movable unit including a connection device connectable to the power storage device; a lifting device that lifts up/down the movable unit to attain one of a plurality of states including a first state in which the movable unit is accommodated under the ground and a second state in which the movable unit is exposed on the ground; an information acquisition device that acquires weather information related to precipitation at an installation location of the charging facility; and a controller that controls an operation of the lifting device. The controller controls the lifting device to attain the second state using the weather information in one of a case where the precipitation is being observed at the installation location or a case where the precipitation is predicted at the installation location until passage of a predetermined time.

In this way, since the second state is attained during the precipitation such as raining, dirt due to sand or mud adhering to an exposed portion of the movable unit can be caused to flow by the water. Therefore, it is possible to suppress occurrence of a problem caused by the entrance of sand or mud into the movable unit.

In an embodiment, a seal is provided between an outer peripheral portion of an upper end of the movable unit and the ground.

In this way, sand and mud adhering to the outer peripheral portion of the movable unit can be removed by the seal when the movable unit is lifted up/down between the first state and the second state.

In another embodiment, the controller controls the lifting device to attain the second state after attaining the first state, for at least one of a time during the precipitation and a time after the precipitation.

In this way, sand and mud adhering to the outer periphery of the movable unit can become wet with water and can be likely to be removed, and the sand and mud adhering to the outer periphery of the movable unit can be removed by the seal when the movable unit is lifted up/down between the first state and the second state.

In an embodiment, the controller maintains the second state until passage of a predetermined time after the precipitation is ended.

In this way, it is possible to prevent a wet state from being maintained because the water-wetted portion can be dried.

A method of controlling a charging facility according to another aspect of the present disclosure is a method of controlling a charging facility of movable type, the charging facility being installed on a bottom surface of a recess formed in a ground, the charging facility being capable of charging an power storage device mounted on a vehicle. The charging facility includes: a movable unit including a connection device connectable to the power storage device, and a lifting device that lifts up/down the movable unit to attain one of a plurality of states including a first state in which the movable unit is accommodated under the ground and a second state in which the movable unit is exposed on the ground. The method includes: acquiring weather information related to precipitation at an installation location of the charging facility; and controlling the lifting device to attain the second state using the weather information in one of a case where the precipitation is being observed at the installation location and a case where the precipitation is predicted at the installation location until passage of a predetermined time.

These and other objects, features, aspects, and advantages of the invention will become apparent from the following detailed description of the invention taken in conjunction with the accompanying drawings, in which:

BRIEF DESCRIPTION OF THE DRAWINGS

FIG. 6 is a flowchart showing an example of processing executed by the control apparatus of the charging station in the modified example.

DESCRIPTION OF THE PREFERRED EMBODIMENTS

Figure 1:
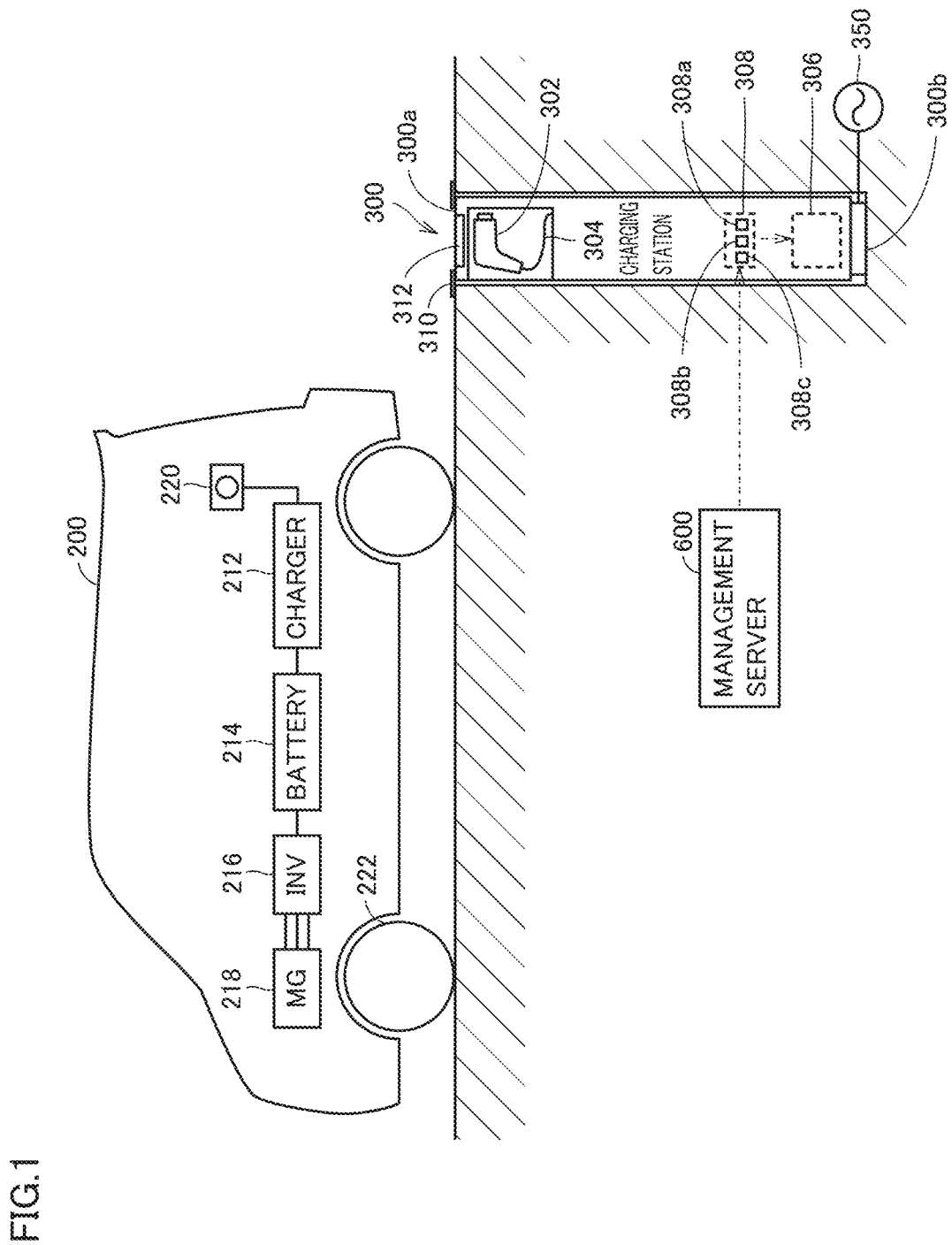
FIG. 1 is a diagram showing an example of a configuration of an electrically powered vehicle and a charging stand in a state where a movable portion is accommodated under the ground.

Hereinafter, embodiments of the present disclosure will be described in detail with reference to the drawings. In the drawings, the same or corresponding portions are denoted by the same reference numerals, and the description thereof will not be repeated.

Figure 2:
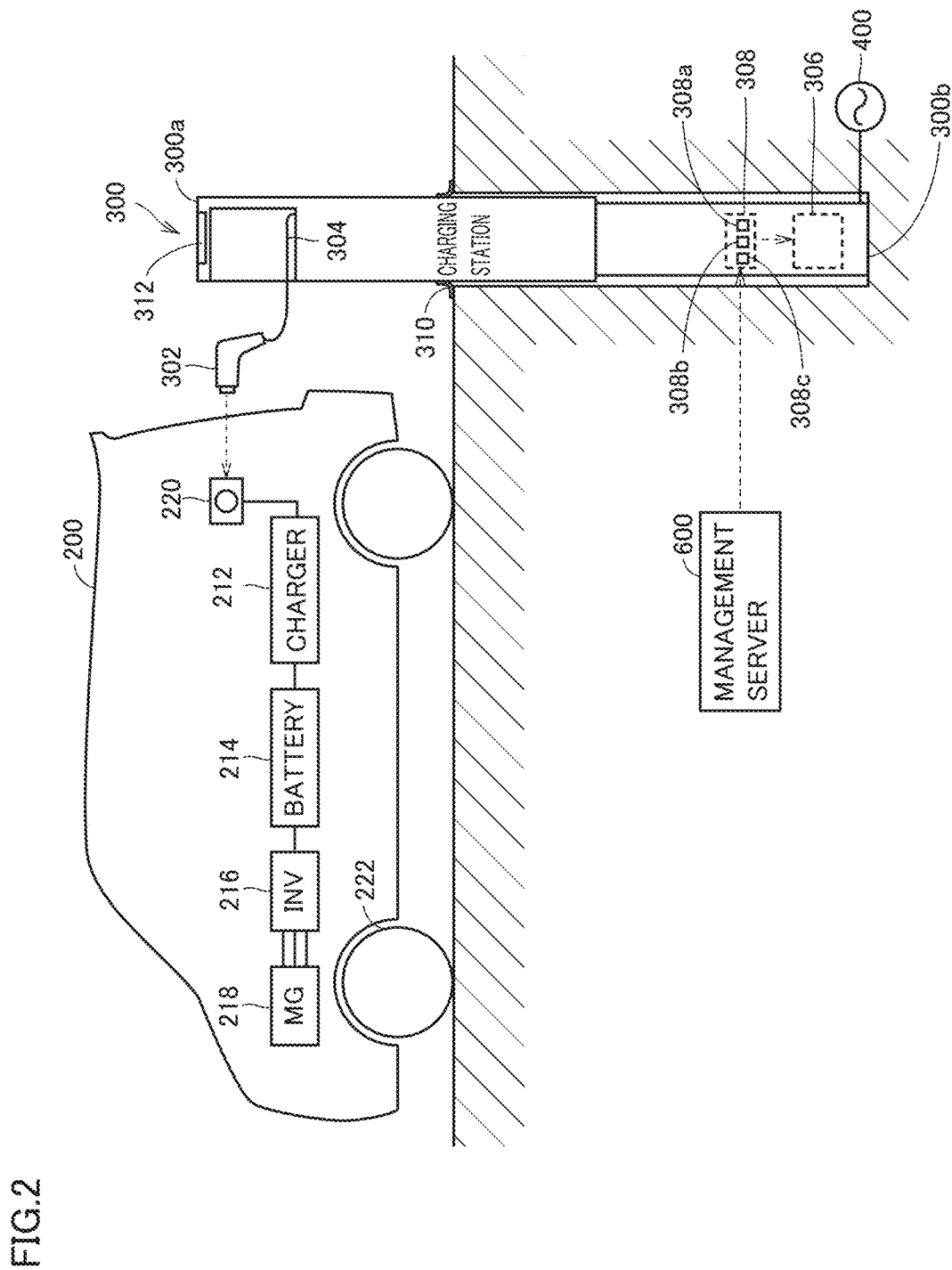
FIG. 2 is a diagram showing an example of a configuration of an electrically powered vehicle and a charging stand in a state where a movable portion is exposed on a ground surface.

Hereinafter, a configuration of a charging station 300 as a charging facility according to an embodiment of the present disclosure will be described as an example. FIG. 1 is a diagram showing an example of a configuration of an electrically powered vehicle 200 and a charging station 300 in a state where a movable portion 300*a* (described later) is accommodated under the ground. FIG. 2 is a diagram showing an example of a configuration of the electrically powered vehicle 200 and the charging station 300 in a state where the movable portion 300*a* is exposed on the ground.

As shown in FIGS. 1 and 2, the charging station 300 is configured to be able to move up and down between a first state (see FIG. 1) in which the position of the upper end is substantially the same as the ground and the movable portion 300*a* is accommodated under the ground and a second state (see FIG. 2) in which the upper end is raised to a predetermined position on the ground and the movable portion 300*a* is exposed.

The charging station 300 has a cylindrical casing, for example, and is installed on a bottom surface of a recess formed in the ground. The recessed portion formed on the ground surface is formed so as to have a predetermined gap with the outer peripheral surface of the housing of the charging station 300, and is formed so as to have a depth approximately equal to the vertical length of the charging station 300 in the first state.

The charging station 300 includes a movable portion 300*a* and a fixed portion 300*b*. An accommodation space in which the connector 302 can be accommodated is formed in an upper portion of the movable portion 300*a*. One end of a cable 304 having the other end connected to the power supply 350 is connected to the connector 302. The power supply 350 is, for example, an AC power supply configured by a commercial power supply or the like. The cable 304 has, for example, a shape stretchable portion having a curled portion or a structural stretchable portion having a winding structure, and is configured to be stretchable to the inlet 220 of the electrically powered vehicle 200 parked in the parking space when the connector 302 is brought out.

A precipitation sensor 312 is provided at an upper end of the movable portion 300*a*. The precipitation sensor 312 is provided at the upper end of the movable portion 300*a*, for example, and detects the presence or absence of water drop. The precipitation sensor 312 may be, for example, a sensor for detecting the amount of precipitation or a sensor for detecting the presence or absence of adhesion of water droplets. The precipitation sensor 312 transmits information indicating the presence or absence of precipitation to the control device 308.

A lip seal 310 is provided between the outer peripheral portion of the upper end of the movable portion 300*a* and the ground. The lip seal 310 is formed of an elastic member such as rubber. The lip seal 310 has a hollow disc shape, and a diameter of an inner peripheral portion thereof is smaller than a diameter of an outer peripheral portion of the movable portion 300*a*. The lip seal 310 is provided such that the central axis thereof is aligned with the central axis of the cylindrical movable portion 300*a*. The outer peripheral portion of the lip seal 310 is fixed to the ground.

When the charging station 300 is in the first state, as shown in FIG. 1, the lip seal 310 formed in this manner is arranged so as to cover the gap between the outer peripheral portion of the upper end of the movable portion 300*a* and the ground. Therefore, when the charging station 300 is in the first state, sand and mud are prevented from entering the gap between the outer peripheral portion of the movable portion 300*a* and the ground.

On the other hand, when the charging station 300 is in the second state, the movable portion 300*a* moves up as shown in FIG. 2. Therefore, the lip seal 310 deforms so that the inner peripheral portion of the lip seal 310 moves above the initial position in the first state in a state where the inner peripheral portion of the lip seal 310 and the outer peripheral portion of the movable portion 300*a* are in contact with each other. When the first state changes to the second state, the outer peripheral portion of the movable portion 300*a* rises while sliding on the inner side portion of the lip seal 310.

The fixing portion 300*b* is fixed to a bottom surface of a concave portion formed in the ground surface. The fixing portion 300*b* may be fixed to any position of the concave portion formed in the ground surface, and is not particularly limited to being fixed to the bottom surface of the concave portion.

The fixed portion 300*b* includes an elevating device (lifting device) 306 for elevating the movable portion 300*a* in the vertical direction, and a control device 308 for controlling the operation of the elevating device 306.

The elevating device 306 may have, for example, a rack-and-pinion mechanism that raises and lowers the movable portion 300*a* by rotating a pinion gear meshed with a rack gear fixed to the movable portion 300*a* using an electric actuator. The elevating device 306 may have a mechanism using a hydraulic cylinder that raises and lowers the movable portion 300*a* by fixing a rod connected to a piston to the movable portion 300*a* and increasing or decreasing a hydraulic pressure supplied to a cylinder body fixed to the fixed portion 300*b*. The elevating device 306 may have a mechanism generating a repulsive force due to a magnetic force between the movable portion 300*a* and the fixed portion 300*b* to move the movable portion 300*a* up and down.

The elevating device 306 moves the movable portion 300*a* up and down to any one of a plurality of states including the first state and the second state. In the present embodiment, the elevating device 306 is configured such that the movable portion 300*a* does not fall beyond a position corresponding to the first state and does not rise beyond a position corresponding to the second state by, for example, a stopper mechanism or the like.

The control device 308 includes CPU (Central Processing Unit) 308*a*, a memory 308*b* configured by a ROM (Read Only Memory), a RAM (Random Access Memory), or the like, and a communication unit 308*c* capable of communicating with an external device. The control device 308 controls electric equipment (e.g., the elevating device 306) provided in the charging station 300 based on information stored in the memory 308*b*, information received via the communication unit (information acquisition device) 308*c*, or information acquired from sensors (e.g., the precipitation sensor 312). Note that these controls are not limited to a configuration in which processing by software is executed by the CPU 308a, but may be configured by dedicated hardware (electronic circuit).

The communication unit 308c is configured to be capable of communicating various kinds of information and the like with an external device of the charging station 300. The communication unit 308c is configured to be capable of communicating with the management server 600, for example. In addition to the management server 600, the communication unit 308c may be configured to be communicable with a mobile terminal (not shown) owned by a user who charges in the charging station 300, or may be configured to be communicable with another charging station 300.

The communication unit 308c may be configured to be capable of communicating with the management server 600 or another charging station 300 by wired communication, for example. Alternatively, the communication unit 308c may be configured to be capable of communicating with the management server 600, the mobile terminal, or another charging station 300 by wireless communication, for example.

For example, when the execution condition of the ascending control (lift-up control) is satisfied, the control device 308 executes ascending control in the elevating device 306 so that the charging station 300 is switched from the first state to the second state. The execution condition of the ascending control includes, for example, a condition that the charging station 300 is in the first state, and a condition that there is a ascending request for the charging station 300. The ascending request may be received from, for example, the management server 600, the mobile terminal, or another charging station 300.

Alternatively, for example, when the execution condition of the descending control (lift-down control) is satisfied, the control device 308 executes descending control in the elevating device 306 so that the charging station 300 is switched from the second state to the first state. The execution condition of the descending control includes, for example, a condition that the charging station 300 is in the second state, and a condition that there is a descending request of the charging station 300. The descending request may be received from, for example, the management server 600, the mobile terminal, or another charging station 300.

The management server 600 includes a control device, a communication device, and a storage device (all not shown). The control device of the management server 600 includes a CPU, a memory, and the like. The communication apparatus of the management server 600 is configured to be capable of communicating with the charging station 300 or another apparatus such as a mobile terminal via a communication network or directly. Predetermined information is stored in the storage device of the management server 600. The control device of the management server 600 receives predetermined information from the electrically powered vehicle 200 or the charging station 300 via the communication device, and stores a part or all of the received information in the storage device.

The management server 600 is configured, for example, to access an external server or the like of the meteorological agency via a communication device to acquire information such as AMeDAS (Automated Meteorological Data Acquisition System) observation data periodically provided by the meteorological agency. The management server 600 stores the acquired information in the storage device. The information acquired from the external server or the like includes, for example, information related to water drop at an installation point of a plurality of charging stations (including the charging station 300) managed by the management server 600.

The information acquired from the external server or the like includes, for example, at least one of the following information: information relating to the presence or absence of water drop at the present point in time at the installation point of the charging station 300; information relating to the amount of water drop at the present point in time at the installation point; information relating to the presence or absence of water drop during a period from the present point in time until a predetermined time elapses; and information relating to the amount of water drop during a period from the present point in time until a predetermined time elapses.

FIGS. 1 and 2 further show an example of the configuration of an electrically powered vehicle 200 that is parked in a parking space that can be charged by a charging station 300. As shown in FIGS. 1 and 2, the electrically powered vehicle 200 includes, for example, a vehicle in which a power storage device such as a plug-in hybrid electric vehicle or a battery electric vehicle is mounted. Note that the configuration of the electrically powered vehicle 200 is not particularly limited to the vehicle listed above as long as it has a configuration capable of receiving power supply from the charging station 300, and may be, for example, a vehicle equipped with a power storage device for external power supply.

The electrically powered vehicle 200 includes a charger 212, a battery 214, an inverter 216, a motor generator 218, and an inlet 220.

When AC power is supplied from the inlet 220, the charger 212 converts the supplied AC power into DC power and supplies the DC power to the battery 214. The battery 214 is charged by the operation of the charger 212. The charger 212 is controlled by, for example, a control signal from an ECU (Electronic Control Unit) (not shown) of the electrically powered vehicle 200.

The battery 214 is, for example, a rechargeable configured power storage element, and typically a secondary battery such as a nickel-hydrogen battery or a lithium-ion battery containing a liquid or solid electrolyte is applied. Alternatively, the battery 214 may be a power storage device capable of storing electric power, and for example, a capacitor having a large capacity may be used instead of the battery 214.

The inverter 216 converts DC power of the battery 214 into AC power, for example, and supplies the AC power to the motor generator 218. The inverter 216 converts AC power (regenerative power) from the motor generator 218 into DC power, and supplies the DC power to the battery 214 to charge the battery 214.

Motor generator 218 receives power from inverter 216 and applies a rotational force to driving wheel 222. The driving wheel 222 is rotated by the rotational force given by the motor generator 218 to drive the electrically powered vehicle 200.

The inlet 220 is provided in the exterior portion of the electrically powered vehicle 200 together with a cover (not shown) such as a lid. The inlet 220 is a power receiving unit that receives charging power from an external charging facility (e.g., charging station 300). The inlet 220 has a shape to which the connector 302 of the charging station 300 can be attached. Contacts are built in both the inlet 220 and the connector 302, and when the connector 302 is attached to the inlet 220, the contacts come into contact with each other, and the inlet 220 and the connector 302 are electrically connected to each other. At this time, the battery 214 of the electrically powered vehicle 200 is ready to be charged using the electric power supplied from the charging station 300.

Figure 3:
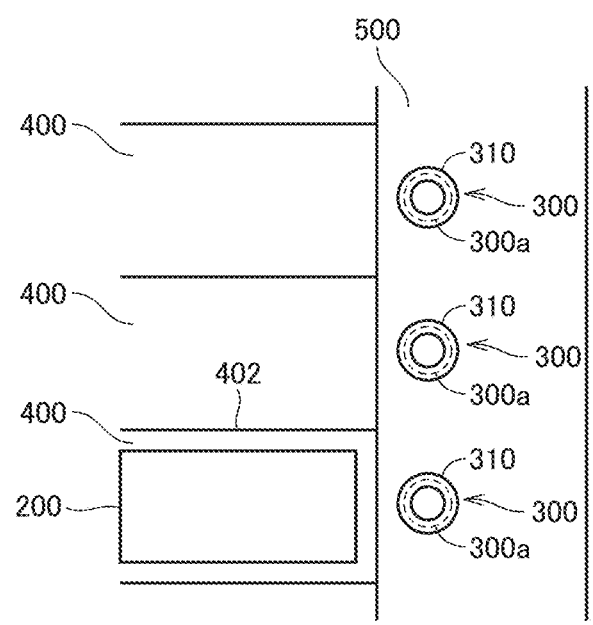
FIG. 3 is a diagram showing an example of a layout of a charging station and a parking space.

The charging station 300 may be installed on a sidewalk adjacent to a plurality of parking spaces in a parking lot, a sidewalk adjacent to a plurality of parking spaces set on a road, or the like. FIG. 3 is a diagram showing an example of a layout of the charging station 300 and the parking space 400. As shown in FIG. 3, when a plurality of parking spaces 400 are horizontally set by partition lines 402 in a parking lot, a charging station 300 is installed at a position adjacent to each parking space 400. FIG. 3 shows an example of a configuration in which a walkway 500 is provided at one end (right side in FIG. 3) in the longitudinal direction of the parking space 400. In this case, the charging station 300 is installed along the walkway 500. When the electrically powered vehicle 200 is parked in any of the plurality of parking spaces 400 and the charging station 300 is in the second state, the user lifts the connector 302 from the charging station 300 and connects to the inlet 220 of the electrically powered vehicle 200.

Figure 4:
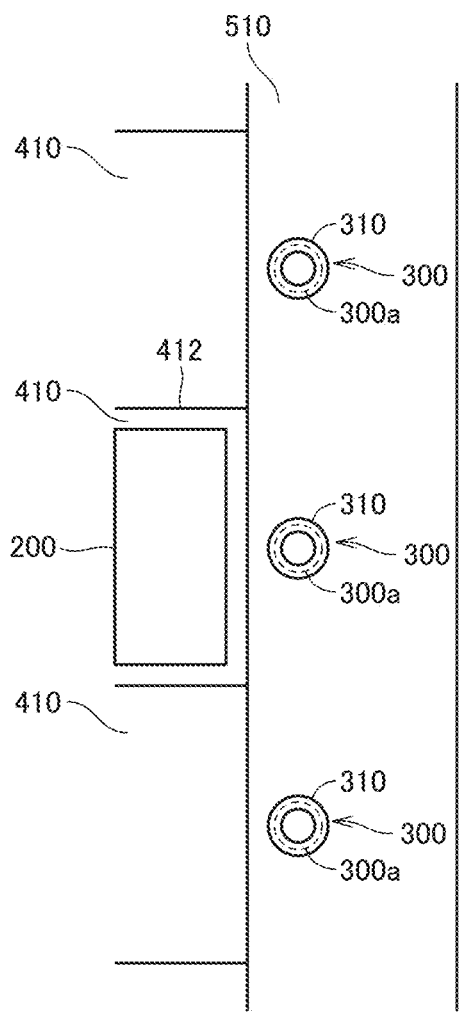
FIG. 4 is a diagram showing another example of the layout of the charging station and the parking space.

FIG. 4 is a diagram showing another example of the layout of the charging station 300 and the parking space 410. As shown in FIG. 4, even when a plurality of parking spaces 410 are set in the parallel direction by the partition lines 412 along the road, the charging station 300 is installed at a position adjacent to each parking space 410. FIG. 4 shows an example of a configuration in which the parking space 410 is set along the walkway 510. In this case, the charging station 300 is installed along the walkway 510. When the electrically powered vehicle 200 is parked in any of the plurality of parking spaces 410 and the charging station 300 is in the second state, the user brings out the connector 302 from the most recent charging station 300 and connects to the inlet 220 of the electrically powered vehicle 200.

When the charging station 300 is in the first state, the user transmits a ascending request to the charging station 300 using the mobile terminal, or transmits a ascending request to the charging station 300 via the management server. The control device 308 of the charging station 300 controls the elevating device 306 to be in the second state upon receipt of a request to rise.

When the movable charging station 300 that can be moved up and down as described above is not in use, since the movable charging station 300 is stored in the concave portion below the ground, sand or mud is likely to enter the movable portion and be soiled. The portion soiled by sand or mud may cause problems such as rust and corrosion.

Therefore, in the present embodiment, the control device 308 of the charging station 300 controls the elevating device 306 so as to be in the second state in either the case where the water drop is observed at the installation point of the charging station 300 using weather information or the case where the water drop is predicted until a predetermined time elapses at the installation point of the charging station 300. The weather information includes at least one of information indicating the presence or absence of water drop detected by the precipitation sensor 312 and information acquired by the management server 600 from an external server or the like.

In this way, since the second state is reached when the water drops such as rain, dirt due to sand or mud adhering to the exposed portion of the movable portion 300a can be caused to flow by the water. Therefore, it is possible to suppress the occurrence of a problem caused by the penetration of sand or mud into the movable portion 300a.

Figure 5:
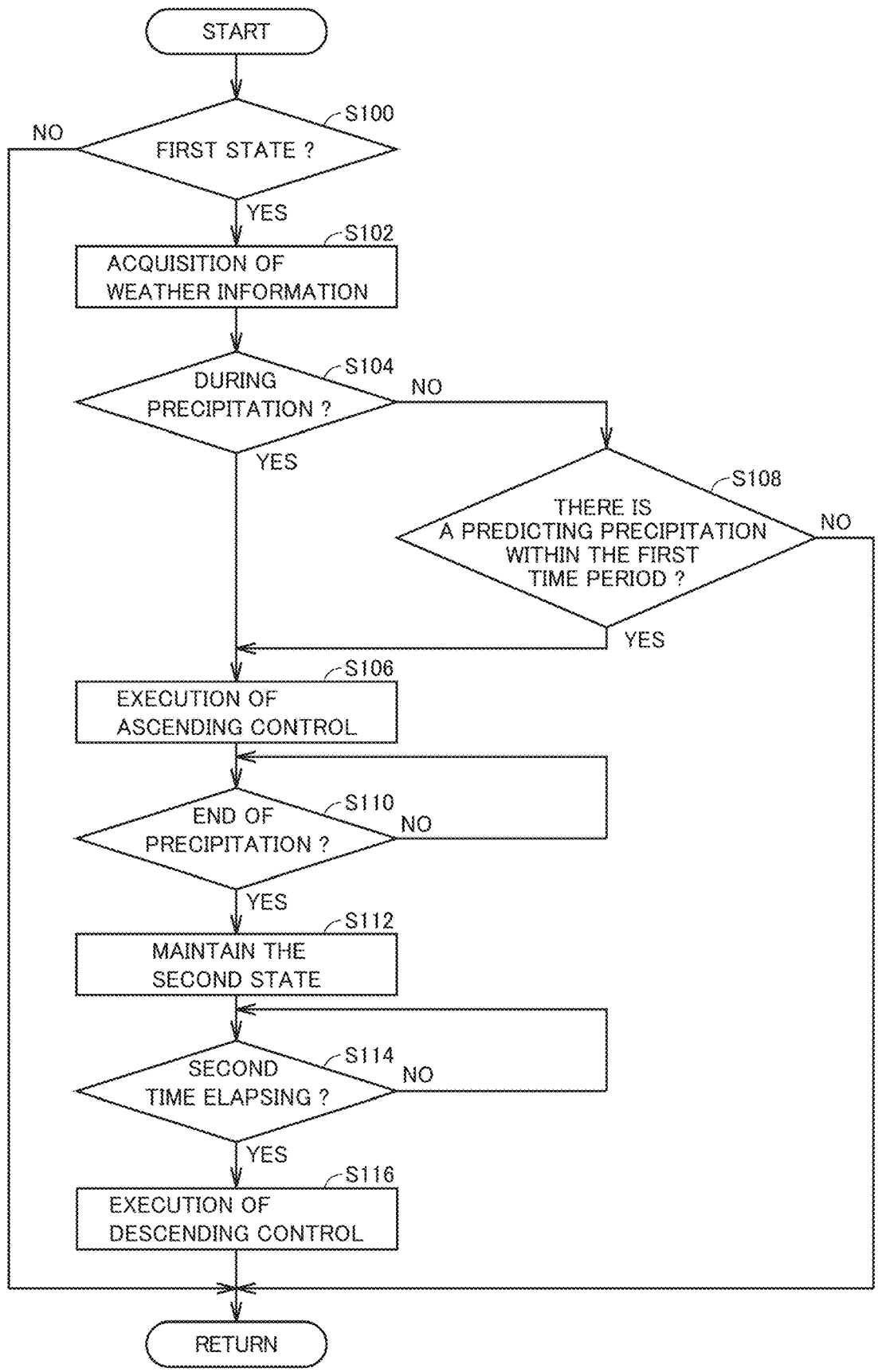
FIG. 5 is a flowchart showing an example of processing executed by the control apparatus of the charging station.

An example of control processing executed by the control device 308 will be described below with reference to FIG. 5. FIG. 5 is a flowchart showing an example of processing executed by the control device 308. A series of processes shown in this flowchart is repeatedly executed by the control device 308 at predetermined control cycles.

In step S100, the control device 308 determines whether the charging station 300 is in the first state. The control device 308 determines that the charging station 300 is in the first state, for example, when the elevating flag is set to the ON state when the ascending control is executed and is set to the OFF state when the descending control is executed. If it is determined that the charging station 300 is in the first state (YES in S100), the process proceeds to S102.

In S102, the control device 308 acquires weather information. The control device 308 acquires, for example, information acquired by the management server 600 from an external server or the like from the management server 600. The information acquired by the management server 600 from the external server or the like is as described above, and detailed description thereof will not be repeated. Further, the control device 308 acquires information indicating the presence or absence of precipitation from the precipitation sensor 312. The control device 308 stores the weather information acquired from the management server 600 and the precipitation sensor 312 in the memory 308b.

In S104, the control device 308 determines whether or not the precipitation occurs. For example, when the precipitation sensor 312 includes information indicating that a water droplet has adhered, the control device 308 determines that the precipitation has occurred. Alternatively, for example, when the amount of precipitation per unit time detected by using the precipitation sensor 312 is larger than a threshold value, the control device 308 determines that the precipitation occurs. Alternatively, when the information acquired from the management server 600 includes information indicating that the precipitation occurs at the installation point of the charging station, the control device 308 determines that the precipitation occurs. Alternatively, when the information acquired from the management server 600 includes the information about the amount of precipitation at the installation point, the control device 308 determines that the precipitation is occurring when the amount of precipitation per unit time at the installation point is larger than the threshold value. The threshold value may be, for example, a predetermined value, and the amount of precipitation per unit time may be set such that dirt adhering to the movable portion 300a is allowed to flow. If it is determined that the precipitation occurs (YES in S104), the process proceeds to S106.

In S106, the control device 308 executes the ascending control. The control device 308 controls the elevating device 306 such that the movable portion 300a rises to a position corresponding to the second state. At this time, the control device 308 sets the elevating flag to the ON state. Thereafter, the control device 308 shifts the process to S110. If it is determined that the water is not falling (NO in S104), the process proceeds to S108.

In S108, the control device 308 determines whether or not the precipitation is predicted within the first time. For example, when the information acquired from the management server 600 includes information that is predicted that the precipitation occurs during a period from the present point in time until the first time elapses at the installation point of the charging station 300, the control device 308 determines that precipitation is predicted within the first time. Alternatively, for example, when the predicted value of the precipitation amount (or the precipitation amount per unit time), which is included in the information acquired from the management server 600, until the first predetermined time elapses from the present point in time at the installation point of the charging station 300 is larger than the threshold value, the control device 308 determines that the precipitation is predicted within the first time. The first time may be a predetermined time, and may be adapted by experiment or the like, or the first time may be made longer as the period between the last time point at which the second state is reached and the current time point is longer, and the first time may be made shorter as the period is shorter. This can prevent the charging station 300 from becoming frequently in the second state. If it is determined that the precipitation is predicted within the first time (YES in S108), the process proceeds to S106.

In S110, the control device 308 determines whether or not the precipitation has been completed. The control device 308 determines that the precipitation has been completed, for example, when the precipitation sensor 312 includes information indicating that no water droplets are attached thereto for a certain period of time. Alternatively, for example, when the amount of precipitation per unit time detected using the precipitation sensor 312 is equal to or less than a threshold value, the control device 308 determines that the precipitation has been completed. Alternatively, when the information acquired from the management server 600 includes information indicating that the precipitation has not occurred at the installation point of the charging station 300, the control device 308 determines that the precipitation is finished. Alternatively, when the information acquired from the management server 600 includes information about the amount of precipitation at the installation point, the control device 308 determines that the precipitation has been completed when the amount of precipitation per unit time at the installation point is equal to or less than the threshold value. If it is determined that the precipitation has been completed (YES in S110), the process proceeds to S112. On the other hand, if it is determined that the precipitation has not been completed (NO in S110), the process returns to S110.

In S112, the control device 308 maintains the second state. The control device 308 maintains the second state by not executing the descending control even when there is a descending request, for example.

In step S114, the control device 308 determines whether or not the second time has elapsed since the end of the precipitation. The second time is a predetermined time, and is set so that moisture adhering to the exposed portion of the movable portion 300a is dried, for example. If it is determined that the second time has elapsed (YES in S114), the process proceeds to S116. On the other hand, when it is determined that the second time has not elapsed since the precipitation is finished (NO in S114), the process returns to S114.

In S116, the control device 308 executes descending control. The control device 308 controls the elevating device 306 such that the movable portion 300a is lowered to a position corresponding to the first state. At this time, the control device 308 sets the elevating flag to the OFF state.

When it is determined that the charging station 300 is not in the first state (NO in S100) or when it is determined that the precipitation is not predicted within the predetermined time (NO in S108), this process is terminated.

An example of the operation of the control device 308 in the present embodiment based on the above-described structure and flowchart will be described.

For example, it is assumed that rain falls at an installation point where the charging station 300 is installed.

When the charging station 300 is in the first state (YES in S100), weather information is acquired (S102). That is, information indicating the presence or absence of precipitation from the precipitation sensor 312 and information acquired by the management server 600 from an external server or the like are acquired. For example, when information indicating that the precipitation have occurred due to the water drops adhering to the precipitation sensor 312 is acquired, it is determined that the water drops (YES in S104), and the ascending control is executed (S106). That is, the elevating device 306 is controlled to be in the second state. When the portion of the movable portion 300a exposed to the ground is wetted with water due to the charging station 300 in the second state, sand, mud, or the like adhering to the movable portion 300a flows.

Next, it is assumed that the precipitation is predicted at the time when the charging station 300 is installed.

When the charging station 300 is in the first state (YES in S100), weather information is acquired (S102). That is, information indicating the presence or absence of precipitation from the precipitation sensor 312 and information acquired by the management server 600 from an external server or the like are acquired. For example, when information indicating that precipitation does not occur by the water drop not adhering to the precipitation sensor 312 is acquired, it is determined that the precipitation does not occur (NO in S104), and it is determined whether or not the precipitation is predicted within the first time (S108). For example, when it is predicted that the amount of precipitation per unit time exceeds the threshold value before the first time elapses, it is determined that precipitation is predicted within the first time (YES in S108), and the increase control is executed (S106). That is, the elevating device 306 is controlled to be in the second state. Due to the second state of the charging station 300, the rain falls until the first time elapses, and when the portion of the movable portion 300a exposed to the ground is wetted with water, sand, mud, or the like attached to the movable portion 300a flows.

When the water drop does not adhere to the precipitation sensor 312 due to the rain and the information indicating that the precipitation has not occurred is acquired, it is determined that the precipitation has been completed (YES in S110), and the second state is maintained. When the second state is maintained in a state where the water is not dropped, a portion of the movable portion 300a exposed on the ground, which is wet to water, dries. Then, when the second time elapses after the end of the precipitation (YES in S114), the descending control is executed (S116). By executing the descending control, the movable portion 300a is placed in the first state in which the movable portion 300a is accommodated in the concave portion below the ground.

When the first state is changed to the second state or the second state is changed to the first state, the movable portion 300a slides with respect to the inner peripheral portion of the lip seal 310, so that dirt due to sand or mud on the outer peripheral portion of the movable portion 300a is further removed.

As described above, according to the charging station 300, which is the charging facility according to the present embodiment, since the state is the second state at the time of precipitation of rain, snow, hail, or the like, dirt due to sand or mud adhering to the exposed portion of the movable portion 300a can be caused to flow by the water. Therefore, it is possible to suppress occurrence of defects such as rust and corrosion caused by entry of sand or mud into the movable portion 300a of the charging station 300. Therefore, it is possible to provide a charging facility and a control method of the charging facility that suppress a problem caused by the intrusion of sand or mud into the movable portion.

Further, when the movable portion 300a moves up and down between the first state and the second state, sand and mud adhering to the outer peripheral portion of the movable portion 300a can be further removed by the lip seal 310.

Further, since the second state is maintained until the second time elapses after it is determined that the precipitation has been completed, the water-wetted portion of the portion of the movable portion 300a exposed on the ground can be dried while the second state is maintained. Therefore, it is possible to suppress the wet state of the movable portion 300a from becoming the first state.

Hereinafter, modified examples will be described. Although the power supply 350 is an AC power supply in the above embodiments, the power supply 350 may be a DC power supply. In this case, the electrically powered vehicle 200 may have a configuration in which, for example, the charger 212 is omitted.

Although the connector 302 is accommodated in the accommodation space in the upper portion of the movable portion 300a in the above-described embodiment, for example, a socket may be exposed on the upper side surface of the movable portion 300a. In this way, the user can charge the battery 214 mounted on the electrically powered vehicle 200 by connecting the socket of the charging station 300 and the inlet 220 of the electrically powered vehicle 200 using a separately prepared charging cable.

Further, in the above-described embodiment, the case where the casing of the charging station 300 has a cylindrical shape has been described as an example, but the casing is not particularly limited to a cylindrical shape as long as the casing can be moved up and down. For example, the housing of the charging station 300 may have a rectangular parallelepiped shape.

Further, in the above-described embodiment, the ascending control is executed when the precipitation occurs or when the precipitation is predicted within the first time, and the descending control is executed after the second state is maintained until the second time elapses from the end of the precipitation. For example, up-and-down control (lifting control) may be executed in which the movable portion 300a is moved up and down when precipitation after the up-and-down control is executed. Alternatively, the up-and-down control may be executed in which the movable portion 300a is moved up and down while the second state is maintained after the precipitation is finished.

FIG. 6 is a flowchart showing an example of processing executed by the control device 308 of the charging station 300 in the modified example.

The flowchart of FIG. 6 is different from the flowchart of FIG. 5 in that it further includes the processing of S200 and the processing of S202. Other processes are the same as those shown in the flowchart of FIG. 5 except for the case described below, and are assigned the same step numbers. Therefore, detailed description thereof will not be repeated.

When the ascending control is executed in S106, the process proceeds to S200. In S200, the control device 308 executes elevating control for elevating the movable portion 300a up and down. In the elevating control, for example, after the descending control is executed from the second state to the first state, the ascending control is executed from the first state to the second state. The elevating control may include a control in which the descending control and the ascending control are repeated a plurality of times, or may include a control in which the movable portion 300a is lowered to a predetermined position between the first state and the second state, and then raised to a position corresponding to the second state. Thereafter, the control device 308 shifts the process to S110.

If it is determined in S110 that the precipitation has been completed (YES in S110), the process proceeds to S202. In step S202, the control device 308 executes elevating control. Since the elevating control is as described above, detailed description thereof will not be repeated. Note that the elevating control in the process of S202 may be executed in the same manner as the elevating control in the process of S200, or the number of times of repeating the descending control and the ascending control may be different, or the position at which the movable portion 300a is lowered in the descending control may be different.

An example of the operation of the control device 308 in the modified example based on the flowchart described above will be described.

For example, it is assumed that rain falls at an installation point where the charging station 300 is installed.

When the charging station 300 is in the first state (YES in S100), weather information is acquired (S102). If it is determined by using the obtained weather information that the precipitation occurs (YES in S104), the ascending control is executed (S106). That is, the elevating device 306 is controlled to be in the second state. When the portion of the movable portion 300a exposed to the ground is wetted with water due to the charging station 300 in the second state, sand, mud, or the like adhering to the movable portion 300a flows. The dirt remaining on the outer peripheral portion of the movable portion 300a is easily removed by being wetted by water.

Therefore, when the elevating control is executed thereafter (S200), the outer peripheral portion of the movable portion 300a slides with respect to the inner peripheral portion of the lip seal 310, so that dirt remaining on the outer peripheral portion of the movable portion 300a is removed by the lip seal 310.

When the water drop does not adhere to the precipitation sensor 312 due to rain and the information indicating that the precipitation has not occurred is acquired, it is determined that the precipitation has been completed (YES in S110), and the elevating control is executed again (S202). By executing the elevating control, dirt remaining on the outer peripheral portion of the movable portion 300a is further removed by the lip seal 310.

Thereafter, the charging station 300 is maintained in the second state (S112). When the second state is maintained in a state where the water is not dropped, a portion of the movable portion 300a exposed on the ground, which is wet to water, dries. Then, when the second time elapses after the end of the precipitation (YES in S114), the descending control is executed (S116). By executing the descending control, the movable portion 300a is placed in the first state in which the movable portion 300a is accommodated in the concave portion below the ground.

Also in this case, since the second state can be achieved at the time of precipitation, dirt due to sand or mud adhering to the exposed movable portion can be flown into the water by the precipitation, and dirt can be removed by the elevation control during the precipitation and the elevation control after the precipitation.

In this modified example, the case has been described as an example in which the elevating control is executed during the precipitation and after the precipitation, but the elevating control may be executed only during the precipitation, or the elevating control may be executed only after the precipitation.

Further, in the above-described embodiment, the case where the control device 308 acquires weather information from the management server 600 has been described as an example, but for example, weather information of the installation point of the charging station 300 may be acquired directly from an external server of the weather agency, weather information of the installation point of the charging station 300 may be acquired from a site that discloses the precipitation state of the Internet, or weather information of the installation point of the charging station 300 may be acquired from an external server of the weather agency. Weather information of the installation point of the charging station 300 may be acquired from a mobile terminal moving around the charging station 300 or another charging station.

In the above-described embodiment, the lip seal 310 is provided so as to cover the space between the outer periphery of the upper end of the movable portion 300a and the ground surface when the charging station 300 is in the first state, but the lip seal 310 may be provided between the outer periphery of the movable portion 300a and the inner peripheral surface of the concave portion, and is not particularly limited to being fixed to the ground surface. One or more lip seals 310 may be provided on the inner peripheral surface of the recess, for example. Further, although the lip seal 310 is formed in a hollow disc shape as an example, the lip seal 310 is not particularly limited to the hollow disc shape, and may be formed by spirally winding a plate-shaped elastic member, or may be formed in a shape in which the area of the contact portion is larger than that of the movable portion 300a. In this way, since the area of the contact portion between the lip seal 310 and the movable portion 300a is larger than that of the hollow disc shape shown in FIGS. 1 and 2, contamination of the outer peripheral portion of the movable portion 300a can be easily removed.

Further, in the above-described embodiment, the control device 308 has been described as determining that the precipitation occurs when the water drop is detected to be attached to the precipitation sensor 312, but the control device 308 may determine that the precipitation occurs when the water drop is detected to be attached to the precipitation sensor 312 a plurality of times in a predetermined period, for example.

Further, in the above-described embodiment, the weather information is acquired from the precipitation sensor 312 and the management server 600, but for example, the weather information may be acquired from the management server 600. The determination of the presence or absence of precipitation at the current time point may be performed using information detected by the precipitation sensor 312, and the determination of whether or not precipitation within a predetermined time period is predicted may be performed using information acquired from the management server 600.

Further, in the above-described embodiment, the weather information is acquired from the precipitation sensor 312 and the management server 600, but when the first determination result of the presence or absence of precipitation at the present time using the precipitation sensor 312 is different from the second determination result of the presence or absence of precipitation at the present time using the information acquired from the management server 600, the presence or absence of precipitation at the present time may be determined according to the priority preset for the first determination result and the second determination result.

Further, in the above-described embodiment, the movable portion 300a is raised to a position corresponding to the second state at the time of precipitation or when precipitation is predicted within the first time, but the present invention is not particularly limited to the case where the movable portion 300a is raised to a position corresponding to the second state in the above-described embodiment as long as the movable portion 300a is raised so that at least the movable portion 300a is exposed. The control device 308 may raise the movable portion 300a to a predetermined state located between the first state and the second state, for example, at the time of precipitation or when precipitation is predicted within the first time.

All or part of the above-described modified examples may be combined as appropriate.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A charging facility of movable type, the charging facility being installed on a bottom surface of a recess formed in a ground, the charging facility being capable of charging a power storage device mounted on a vehicle, the charging facility comprising:
   a movable unit including a connection device connectable to the power storage device;
   a lifting device configured to lift up/down the movable unit to attain one of a plurality of states including a first state in which the movable unit is accommodated under the ground and a second state in which the movable unit is exposed on the ground;
   an information acquisition device configured to acquire weather information related to precipitation at an installation location of the charging facility; and
   a controller configured to control an operation of the lifting device, wherein
   the controller is configured to control the lifting device to attain the second state using the weather information in one of a case where the precipitation is being observed at the installation location and a case where the precipitation is predicted at the installation location until a first predetermined time from a present time elapses,
   a seal is provided between an outer peripheral portion of an upper end of the movable unit and the ground, and
   the controller is configured to control the lifting device to attain the second state after attaining the first state, for a time during the precipitation and a time after the precipitation.

2. The charging facility according to claim 1, wherein the controller is configured to maintain the second state until a second predetermined time from an end of the precipitation elapses.

3. The charging facility according to claim 2, wherein the controller is configured to maintain the second state by not lifting down the movable unit even when a request to lift down the movable unit is made, until the second predetermined time from the end of the precipitation elapses.

4. The charging facility according to claim 3, wherein the second predetermined time is set to allow moisture adhering to a portion of the movable unit exposed on the ground to be dried.

5. The charging facility according to claim 4, wherein the controller is configured to, in response to determining the end of the precipitation, execute elevating control to lift the movable unit up and down.

6. The charging facility according to claim 5, wherein the elevating control includes a control in which the movable unit is repeatedly lifted up and down a plurality of times.

7. The charging facility according to claim 5, wherein the elevating control includes a control in which the movable unit is lifted down to a predetermined position between the first state and the second state, and then lifted up to a position corresponding to the second state.

8. A method of controlling a charging facility of movable type, the charging facility being installed on a bottom surface of a recess formed in a ground, the charging facility being capable of charging an power storage device mounted on a vehicle, the charging facility including
- a movable unit including a connection device connectable to the power storage device,
- a lifting device that lifts up/down the movable unit to attain one of a plurality of states including a first state in which the movable unit is accommodated under the ground and a second state in which the movable unit is exposed on the ground, and
- a seal provided between an outer peripheral portion of an upper end of the movable unit and the ground, the method comprising:
acquiring weather information related to precipitation at an installation location of the charging facility;
controlling the lifting device to attain the second state using the weather information in one of a case where the precipitation is being observed at the installation location and a case where the precipitation is predicted at the installation location until a first predetermined time from a present time elapses; and
controlling the lifting device to attain the second state after attaining the first state, for a time during the precipitation and a time after the precipitation.

* * * * *